Figure 2:
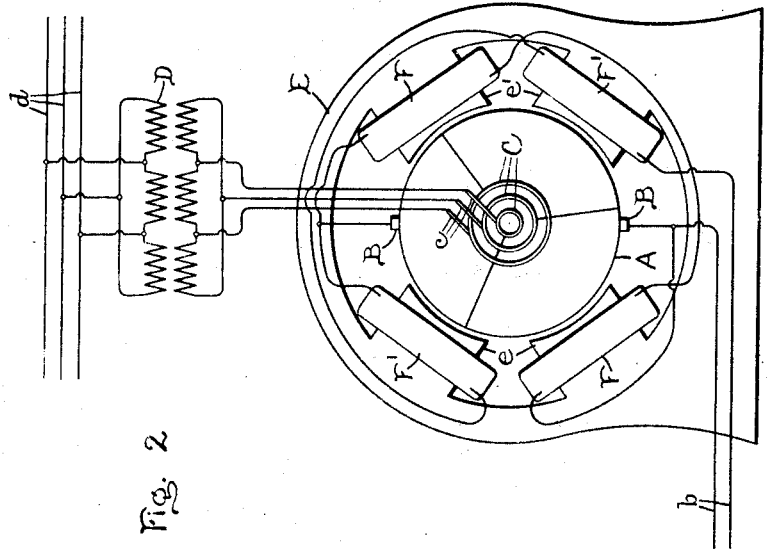

J. L. BURNHAM.
ROTARY CONVERTER.
APPLICATION FILED MAR. 28, 1908.

981,059.

Patented Jan. 10, 1911.

2 SHEETS—SHEET 1.

WITNESSES:
Lester H. Fulmer
J. Ellis Glen

INVENTOR
JOSEPH L. BURNHAM.
BY Albert H. Dam
ATT'Y.

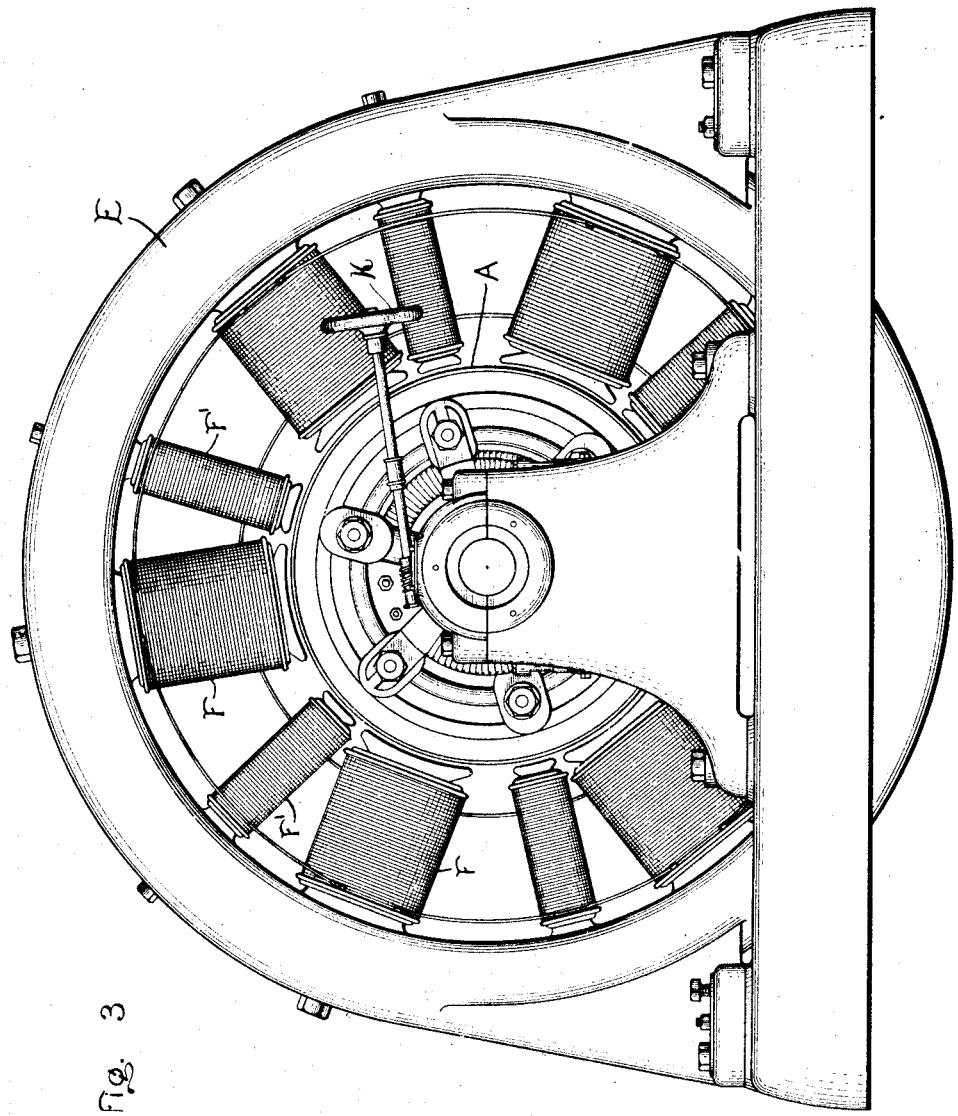

UNITED STATES PATENT OFFICE.

JOSEPH L. BURNHAM, OF SCHENECTADY, NEW YORK, ASSIGNOR TO GENERAL ELECTRIC COMPANY, A CORPORATION OF NEW YORK.

ROTARY CONVERTER.

981,059. Specification of Letters Patent. Patented Jan. 10, 1911.

Application filed March 28, 1908. Serial No. 423,833.

*To all whom it may concern:*

Be it known that I, JOSEPH L. BURNHAM, a citizen of the United States, residing at Schenectady, county of Schenectady, State of New York, have invented certain new and useful Improvements in Rotary Converters, of which the following is a specification.

My invention relates to rotary converters, and its object is to provide a rotary converter in which the ratio of the voltages of the currents supplied to and taken from the converter may be varied over a very wide range.

My invention in one aspect consists in a novel method of operating a rotary converter which consists in shifting the effective line of field magnetization circumferentially with respect to the field magnet so as to shift the magnetization with respect to the commutator brushes to vary the voltage ratio of conversion without altering the relative positions of the field magnet and brushes.

My invention further consists in so arranging the field magnet of the converter that the field magnetization may be shifted circumferentially with respect to the commutator brushes. I accomplish this by so arranging the field magnet that its magnetization can be shifted circumferentially with respect to the field structure, so that the relation of the brushes to the field structure is not altered and the brushes remain properly positioned for good commutation. By thus shifting the field magnetization, the point on the wave of induced voltage in the armature at which commutation takes place is shifted, so that the ratio of the voltage of the current taken from the brushes to the voltage induced in the armature, or in other words, to the voltage supplied to the armature is varied. For instance, if the field magnetization is at right-angles to the line of the armature circuit between the commutator brushes, the brushes are at the point of maximum induced voltage, as in the ordinary rotary converter. If the line of magnetization should be shifted ninety electrical degrees, so as to be in line with the armature circuit between the brushes, the brushes would be at the point of zero induced electromotive force, and for any intermediate position of the field magnetization, the voltage at the brushes will have a value intermediate zero and maximum.

The field may be given a number of polar projections, twice the pole number for which the armature is wound, and half the poles may have a constant magnetization, while the other poles, alternating with those of constant strength, may have their magnetization varied in amount, either manually or automatically, to shift the field magnetization.

My invention will best be understood by reference to the accompanying drawings, in which—

Figure 1:
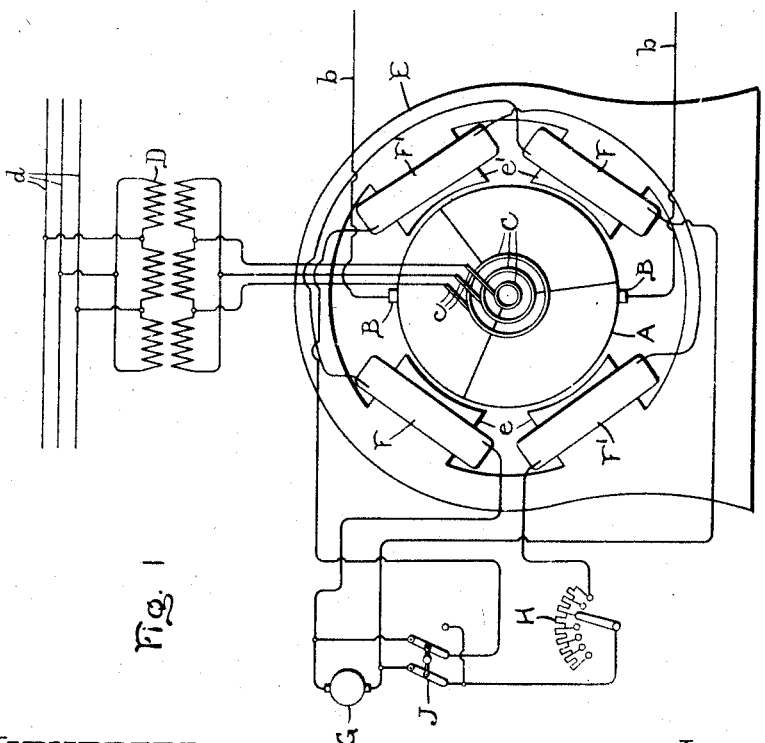

Figures 1 and 2 are explanatory diagrams, and Fig. 3 is an end-elevation of a machine constructed in accordance with my invention.

In Fig. 1, A represents the armature of a rotary converter provided with a commutator and commutator brushes B B connected to leads $b\ b$, through which direct-current may be led from the machine. C represents collector rings. Through these collector rings and through brushes $c$ three-phase current may be supplied to the machine from the transformers D, the primaries of which are connected to the alternating-current circuit $d$. E represents the field-magnet, which is provided with polar projections $e$ and $e^1$. As is indicated by the positions of the commutator brushes B B and the connections of the collector rings C, the armature is arranged for a bipolar machine. The field-magnet, however, is provided with four polar projections. The polar projections $e$ form in effect one pole, while the polar projections $e^1$ form in effect the other pole. On the upper polar projection $e$ and the lower projection $e^1$ are coils F, which may be energized with current of constant strength from any suitable source, as, for instance, from the exciter G. Coils $F^1$ are placed on the other polar projections, and I have shown these coils connected to the exciter G through rheostat H and reversing switch J so that the current strength in these coils may be varied and the direction of current in them may be reversed with respect to the direction of current in the coils F, F.

The operation of the machine shown diagrammatically in Fig. 1, is as follows: If the coils $F\ F^1$ are supplied with their maximum current, and are so connected that both polar projections $e$ are of one polarity, and both polar projections $e^1$ are of the opposite polarity, the machine operates as an ordinary rotary converter with the brushes B B at the point of maximum induced voltage in the armature. If, without changing the current strengths through the coils F F¹, the reversing switch J is thrown to its other position, the polarity of lower polar projections e and upper polar projection e¹ will be reversed. The effect will be to shift the line of field magnetization from a horizontal to a vertical position,—or, in other words, to bring it into line with the commutator brushes B B. With the field coils thus connected, the commutator brushes are at the point of zero induced voltage. If, instead of reversing the field coils F¹ F¹, the current through them is gradually decreased by means of the rheostat H, the field magnetization is caused to assume intermediate positions, so as to give intermediate values of the voltage at the brushes B B. The variation in voltage ratio, due to shifting the field, is to some extent supplemented by variation due to change in the wave shape of the alternating voltage because of the change in flux distribution.

Because of the irregular distribution of the field flux, the induced alternating voltage in the armature contains harmonics, so that a delta connection of the armature, as indicated in the drawing by the leads 120° apart, or a double delta, for six-phase collector should be used rather than a diametrical connection, since the delta connection minimizes the effect of the induced harmonics.

With the field coils connected as shown in Fig. 1, the direction of rotation of the armature is preferably counter-clockwise, as indicated by the positions of the collector ring brushes, so that the polar projections, which are being approached by the coils undergoing commutation, are those energized by the coils F F, which have a constant current strength, so that a field of constant strength may be obtained for commutation. It will be noted that the position of the brushes with respect to this commutating field or flux fringe from the pole tips is not varied by the shifting of the line of magnetization in the field magnet structure.

Fig. 2 is similar to Fig. 1, except that the coils F¹ F¹ are connected in series with the brushes B B, so that the current strength in them is varied automatically by the load on the converter. This produces an automatic compounding, or over-compounding, of the machine. With this arrangement the positions of the coils F and F¹ may be reversed, as compared with Fig. 1, since the polar projections energized by the coils F¹ will now have a flux which varies in strength with the armature current, and such a flux, if of sufficient strength, is, of course, even better for commutation than the flux of constant strength obtained by the arrangement of Fig. 1.

In the diagrams of Figs. 1 and 2, the polar projections are shown all of the same size. This is the preferable construction, when it is desired to vary the voltage from maximum to zero. For a smaller range of voltage, however, the polar projections, the strength of which is to be varied, may advantageously be made smaller than the polar projections of constant magnetic strength. This is the arrangement shown in Fig. 3, in which the poles carrying the coils F¹, the current in which is to be varied, are made considerably smaller than the main poles carrying the coils F, the current strength in which is constant. I have found that a machine constructed as shown in this figure will give a range of voltage for the direct-current from 175 to 350 volts, the alternating-current voltage being held constant. The direction of rotation of the armature may be toward the main poles, or if the magnetization of the smaller or auxiliary poles is controlled by a series winding of sufficient strength to give a satisfactory commutating field, the machine may be run in the opposite direction. The auxiliary or regulating poles are placed closer to the main poles on one side than the other, in order to furnish on that other side a comparatively wide neutral space for commutation. The main poles may be shunt wound, or compounded for maintaining unity power factor with varying load. A hand-wheel K may be provided for adjusting the position of the brushes initially. After they are once set, no further adjustment is required in operation.

While I have described my machine operated as a rotary converter, it is evident that when driven by mechanical power it may be used as a double-current generator with variable voltage ratio between the alternating and direct voltages. Consequently, although in the following claims I speak of the machine as a rotary converter, I wish it understood that I intend thereby to cover the machine structure without limitation to the use to which it is put.

I do not desire to limit myself to the particular construction and arrangement of parts here shown, but aim in the appended claims to cover all modifications which are within the scope of my invention.

What I claim as new and desire to secure by Letters Patent of the United States, is,—

1. A variable voltage rotary converter comprising an armature provided with a commutator and brushes, connections for supplying current to and leading current from said armature, a field magnet frame having magnetic poles surrounding said armature, field magnet windings on said frame, and connections for shifting the line of effective magnetization circumferentially with respect to the field magnet by a variation in the relative current strengths in said windings, whereby the magnetization is shifted with respect to said brushes without altering the relative positions of field magnet and brushes.

2. A variable voltage rotary converter comprising an armature provided with a commutator and brushes, connections for supplying current to and leading current from said armature, a field magnet within the magnetization of which the armature revolves having poles in number twice the pole number for which the armature is wound, a set of field coils for magnetizing alternate poles, a second set of field coils for magnetizing the other poles, and separate circuits for the two sets of field coils whereby a relative variation of current in said two circuits shifts the line of effective field magnetization circumferentially with respect to said brushes.

3. A variable voltage rotary converter comprising an armature provided with a commutator and brushes, connections for supplying current to and leading current from said armature, a field magnet frame having magnetic poles surrounding said armature in number twice the pole number for which the armature is wound, and coils and connections therefor for producing a magnetization of said poles variable in strength in alternate poles relatively to the other poles, by which relative variation the line of effective field magnetization is shifted circumferentially with respect to said brushes.

4. A variable voltage rotary converter comprising an armature provided with a commutator and brushes, connections for supplying current to and leading current from said armature, a field magnet having poles in number twice the pole number for which the armature is wound, a set of field coils on alternate poles, a circuit therefor in which the current is substantially constant, and field coils on every other polar projection connected in series with the armature so as to shift the line of effective field magnetization circumferentially with respect to said brushes with variation in load.

5. A variable voltage rotary converter comprising an armature provided with a commutator and brushes, connections for supplying current to and leading current from the armature, a field-magnet within the magnetization of which the armature revolves having poles in number twice the pole number for which the armature is wound, field coils and connections arranged to maintain a substantially constant magnetization in alternate poles, and coils and connections for the remaining poles whereby the magnetization of the remaining poles may vary so as to shift the line of effective magnetization circumferentially with respect to the field-magnet, whereby the field magnetization is shifted circumferentially with respect to the commutator brushes without altering the relative positions of brushes and field poles.

6. A variable voltage rotary converter comprising an armature provided with a commutator and brushes, connections for supplying current to and leading current from the armature, a field magnet within the magnetization of which said armature revolves having poles in number twice the pole number for which the armature is wound, field coils and connections arranged to maintain a substantially constant magnetization in alternate poles, and field coils on the remaining poles connected in series with the armature so as automatically with varying load to shift the line of effective magnetization circumferentially with respect to the field magnet, whereby the field magnetization is shifted circumferentially with respect to the commutator brushes without altering the relative positions of brushes and field poles.

7. A variable voltage rotary converter comprising an armature provided with a commutator and brushes, connections for supplying current to and leading current from the armature, a field magnet within the magnetization of which said armature revolves having poles in number twice the pole number for which the armature is wound, field coils and connections arranged to maintain a substantially constant magnetization in alternate poles, and coils and connections for the remaining poles whereby the magnetization of the remaining poles may vary so as to shift the line of effective magnetization circumferentially with respect to the field magnet, said remaining poles being placed closer to the poles of constant strength on one side than on the other, whereby a neutral space is left on said other side for commutation.

8. A variable voltage rotary converter comprising an armature provided with a commutator and brushes, connections for supplying current to and leading current from the armature, a field magnet within the magnetization of which said armature revolves having alternating main and auxiliary poles, said auxiliary poles being placed closer to the main poles on one side than on the other, and field coils and connections for the auxiliary poles whereby the magnetic strength of said auxiliary poles may vary relative to the main poles.

9. A variable voltage rotary converter comprising an armature provided with a commutator and brushes, connections for supplying current to and leading current from the armature, a field magnet within the magnetization of which said armature revolves having alternating main and auxiliary poles, said auxiliary poles being placed closer to the main poles on one side than on the other, field coils for the main and auxiliary poles respectively, and separate circuits for the main field coils and for the auxiliary field coils.

10. A variable voltage rotary converter comprising an armature provided with a commutator and brushes, connections for supplying current to and leading current from said armature, a field magnet surrounding said armature provided with a plurality of sets of coils displaced circumferentially from each other, and connections for said coils whereby the relative current strengths in said sets may vary so as to shift the effective line of field magnetization circumferentially with respect to the field magnet and consequently with respect to the brushes.

11. The method of varying the voltage ratio of conversion of a rotary converter which consists in causing the effective line of field magnetization to shift circumferentially with respect to the field magnet whereby the magnetization is shifted with respect to the brushes without altering the relative position of the field magnet and brushes.

12. The method of varying the voltage ratio of conversion of a rotary converter having a plurality of exciting circuits each including alternate field coils which consists in causing the relative current strengths to vary in said circuits whereby the magnetization of the field magnet is shifted circumferentially with respect to the brushes without altering the relative position of the field magnet and brushes.

In witness whereof, I have hereunto set my hand this 27th day of March, 1908.

JOSEPH L. BURNHAM.

Witnesses:
  HELEN ORFORD,
  CHARLES McCLAIR.